US005663551A

United States Patent [19]
Hone et al.

[11] Patent Number: 5,663,551
[45] Date of Patent: Sep. 2, 1997

[54] BOOT WITH REPLACEABLE OPTICAL ELEMENT FOR A BAR CODE SCANNER

[75] Inventors: L. Michael Hone, Pittsford; Vincent T. LaManna, Webster, both of N.Y.

[73] Assignee: PSC Inc., Webster, N.Y.

[21] Appl. No.: 580,241

[22] Filed: Dec. 28, 1995

Related U.S. Application Data

[63] Continuation of Ser. No. 302,093, Sep. 7, 1994, Pat. No. 5,512,740, which is a continuation of Ser. No. 59,799, May 10, 1993, abandoned.

[51] Int. Cl.$^6$ .................................................. G06K 7/10
[52] U.S. Cl. ................................... 235/472; 235/467
[58] Field of Search ................................. 235/472, 467

[56] References Cited

U.S. PATENT DOCUMENTS

| 2,163,329 | 6/1939 | Sipior . |
| 2,285,658 | 6/1942 | Hitchcock . |
| 2,961,108 | 11/1960 | Johnson . |
| 3,229,075 | 1/1966 | Palti . |
| 3,587,184 | 6/1971 | Walker, Jr. . |
| 3,768,688 | 10/1973 | Linke . |
| 3,896,589 | 7/1975 | Mitchell . |
| 4,076,373 | 2/1978 | Moretti . |
| 4,454,686 | 6/1984 | Stapenell . |
| 4,466,221 | 8/1984 | Couture . |
| 4,479,656 | 10/1984 | Collins . |
| 4,656,344 | 4/1987 | Mergenthaler et al. ............ 235/462 |
| 4,687,127 | 8/1987 | Pardo et al. . |
| 4,700,656 | 10/1987 | Cone et al. . |
| 4,794,240 | 12/1988 | Schorr et al. ...................... 235/467 |
| 4,826,096 | 5/1989 | Bailey et al. . |
| 5,042,821 | 8/1991 | Bondy . |
| 5,150,528 | 9/1992 | Shire . |
| 5,162,942 | 11/1992 | Anzai et al. . |
| 5,165,782 | 11/1992 | Maglica et al. . |
| 5,177,347 | 1/1993 | Wike, Jr. ........................... 235/467 |
| 5,181,140 | 1/1993 | Brown et al. . |
| 5,187,354 | 2/1993 | Bengtsson ......................... 235/472 |
| 5,200,597 | 4/1993 | Eastman et al. .................. 235/455 |
| 5,512,740 | 4/1996 | Hone et al. ....................... 235/472 |

FOREIGN PATENT DOCUMENTS

| 67-171126 | 8/1986 | Japan . |
| 61-245130 | 10/1986 | Japan . |
| 3-12582 | 1/1991 | Japan . |
| 7110736 | 2/1972 | Netherlands . |
| 526120 | 9/1972 | Switzerland . |
| 821235 | 10/1959 | United Kingdom . |

*Primary Examiner*—Harold Pitts
*Attorney, Agent, or Firm*—Foley & Lardner

[57] ABSTRACT

A hand-held bar code scanner has a removable boot to hold a field-replaceable optical element, which is sandwiched between an opening formed at the nose section of the scanner housing and the face section of the boot. The replaceable optical element can be, for example, a transparent element, filter, lens, or Brewster Window.

8 Claims, 5 Drawing Sheets

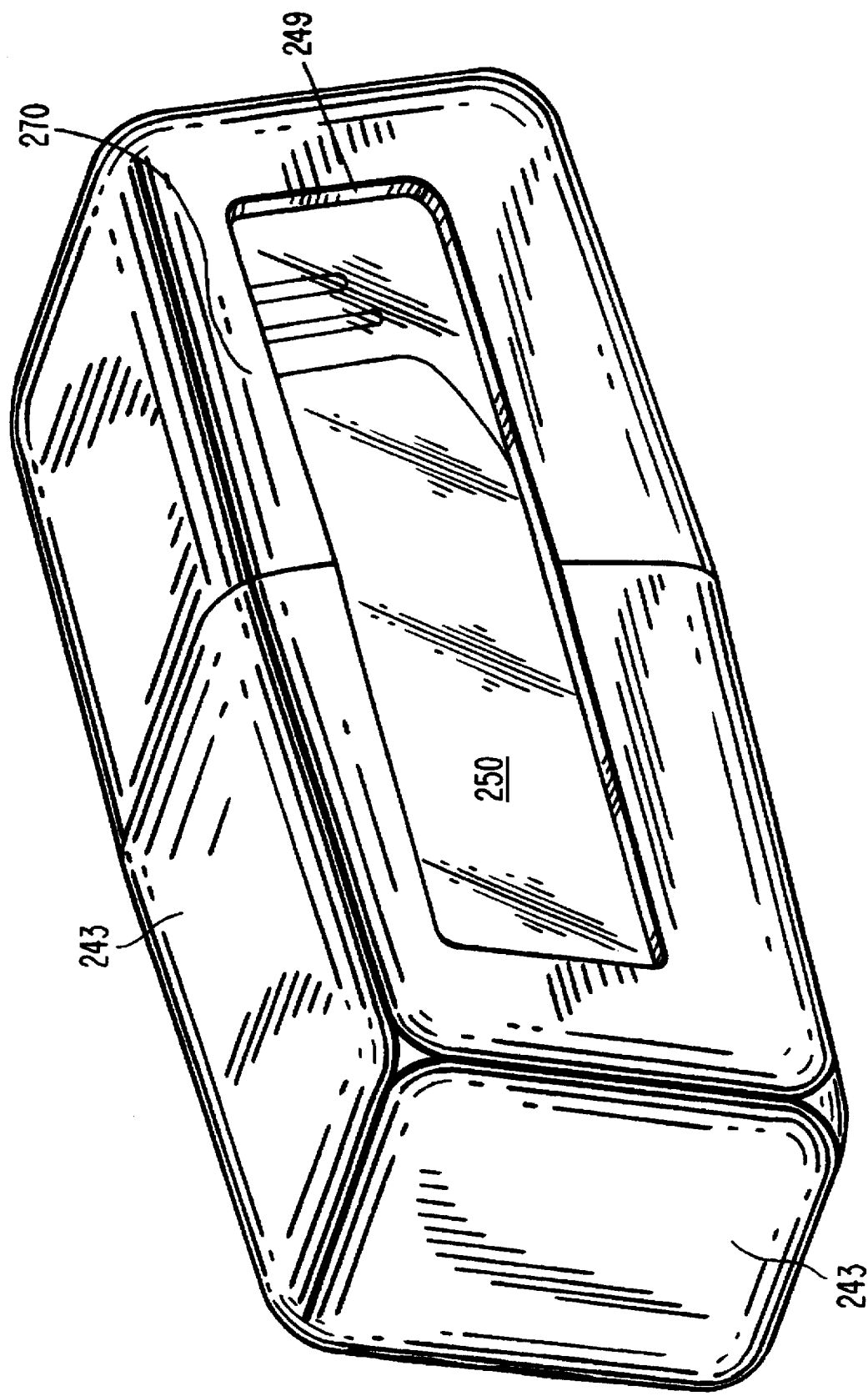

BOOT WITH REPLACEABLE OPTICAL ELEMENT FOR A BAR CODE SCANNER

CROSS-REFERENCE

This is a continuation of application Ser. No. 08/302,093, filed Sep. 7, 1994, now U.S. Pat. No. 5,512,740, which is a continuation of application Ser. No. 08/059,799, filed May 10, 1993, now abandoned.

DESCRIPTION

1. Field of the Invention

The present invention relates to systems for scanning and reading bar codes and other optically discernible symbols and, particularly, to a hand-held bar code scanner and reader system having a housing with a window from which the scan beam exits. The present invention relates more particularly to a field-replaceable window and/or optics assembly for a hand-held bar code scanner. Still more particularly, an assembly according to the present invention comprises a boot to hold a window and/or optics proximate to the scanner housing in front of the housing. The optical element may be held over the optical window opening by means of a end cap called a "boot". The optical element is most typically a window but may also be a filter or lens.

2. Related Applications

This application is related to a design application entitled "Hand-held Optical Scanner" filed on May 10, 1993, Ser. No. 29/088,077. It is also related to a design application entitled "Hand-Held Optical Scanner" filed on May 4, 1993, Ser. No. 29/007,917. Both of these design applications are assigned to PSC, Inc., to which the present application is commonly assigned.

BACKGROUND AND SUMMARY OF THE FEATURES OF THE INVENTION

Laser-scanner based bar code reader systems have been in use for some time. These scanners typically comprise a housing having a laser and associated optics therein. Such a laser and associated optics are disclosed, for example, in U.S. Pat. No. 5,200,957, issued to Jay Eastman, et al., on Apr. 6, 1993, the disclosure of which is incorporated by reference, where the laser is integrated together with electronics on a "scan engine" comprising a printed circuit board. The housing is typically a closed structure that supports, among other components, the laser, which produces light to scan the target, and the photodetector, which receives light returned from the scanned target. Again typically, the housing has at least one optical window. Light from the laser is optically directed to exit this window, and light returned from the scanned bar code enters this window and is directed toward the photodetector. Thus, the performance of the scanner in many respects depends on this window. The window must be quite light transmissive, and hard enough to resist damage. Unfortunately, during ordinary scanner operation, the window may become damaged and require replacement. In known scanner systems of the prior art, the window could only be replaced by disassembling the unit, and reconstructing the housing, and reassembling the scanner.

No presently known bar code scanner features a field replaceable window. Yet other deVices have field replaceable windows. None of the existing designs of the prior art suggest even the possibility, let alone how, a field replaceable window could be incorporated in a bar code scanner.

Upgrading a window, too, would be desirable. It may, for example, be desirable to upgrade a bar code window to a "Brewster Scanner Window" of the type disclosed in a patent application Ser. No. 08/059,045 filed on May 7, 1993 entitled "Brewster Window Bar Code Scanner" in the name of Edward Coleman, et al and assigned to the present assignee.

It may also be desirable to add other optical elements or functions to the scanner. For example, a filter, or special anti-scratch coating might be desirable in one environment, and coated optics in another environment.

A lens cap having a window therein is shown in U.S. Pat. No. 5,162,942, issued to Anzia et al. The lens cap window features an interior transparent pane and an exterior semi-transparent (e.g. merely translucent) pane, with a gap known as a title inserting portion between the two panes. (Col. 5, lines 50–65) Into this title insertion portion is placed a "title recording paper" upon which desired screen titles are written for easy photographing in macro or close-up fashion.

A seal assembly for covering an indicator light opening in a control panel is shown in U.S. Pat. No. 3,587,184, issued to Walker. In Walker, an elastomeric seal covers the entirety of the opening, and a window is inserted into an integral lip on the outside of that window. The elastomeric seal, unlike that of the present invention, covers the entire opening.

Bengtsson, in U.S. Pat. No. 5,187,354, discloses a hand scanner for reading bar codes and deactivating surveillance tags, which uses a "rubber cuff or sleeve" to hold permanent magnets about the periphery of an opening in the housing. (Col. 2, lines 29–35). Bengtsson does not teach anything about securing a window about the opening of a scanner.

U.S. Pat. No. 5,177,347, issued to Wike, describes "a scanning unit 26 [(that)] is mounted within the main body portion 24 by means of a support ring 28 which, in addition to supporting the scanning unit 26, also supports a cover member 30 having an opening 32 in which is positioned the face portion 34 of the scanning unit 26. The cover member 30 may be constructed of a transparent material such as acrylic and is shock mounted with respect to the face portion 34 by means of a ring of elastic foam material 36." (Col. 2, line 65 to Col. 3, line 6)

Unlike the present invention the cover in Wike does not support a window. Instead the cover is supported by a ring. This ring on the main body supports, on one side, the cover with an opening therein, and the same ring supports, on the other side, the scan unit having a [window-like] face 34 thereon. Thus, the cover is supported by the same structure as the face; unlike in the present invention, the cover itself does not support the face. Thus, changing the cover of Wike does not afford any easy way of changing any optical element of Wike. Thus, Wike does not teach the present invention.

U.S. Pat. No. 5,165,782, to Maglica et al. discloses a "Shock absorbing lens holder and anti-roll device" for a flashlight; it teaches a way of holding a filter in front of the flashlight lens. This patent does not teach the apparatus of the present invention, which is composed entirely of shock absorbing material, and which requires no further frame, anti-roll or otherwise, to hold it in place. Furthermore, Maglica's apparatus requires that it be mounted on a flashlight already having a sealed lens; the present invention provides what may be a lens, or window, and mounts directly on the scanner.

BRIEF DESCRIPTION OF THE DRAWINGS

FIG. 5 is a perspective view of the boot used with the bar code scanner.

DETAILED DESCRIPTION

Figure 1:
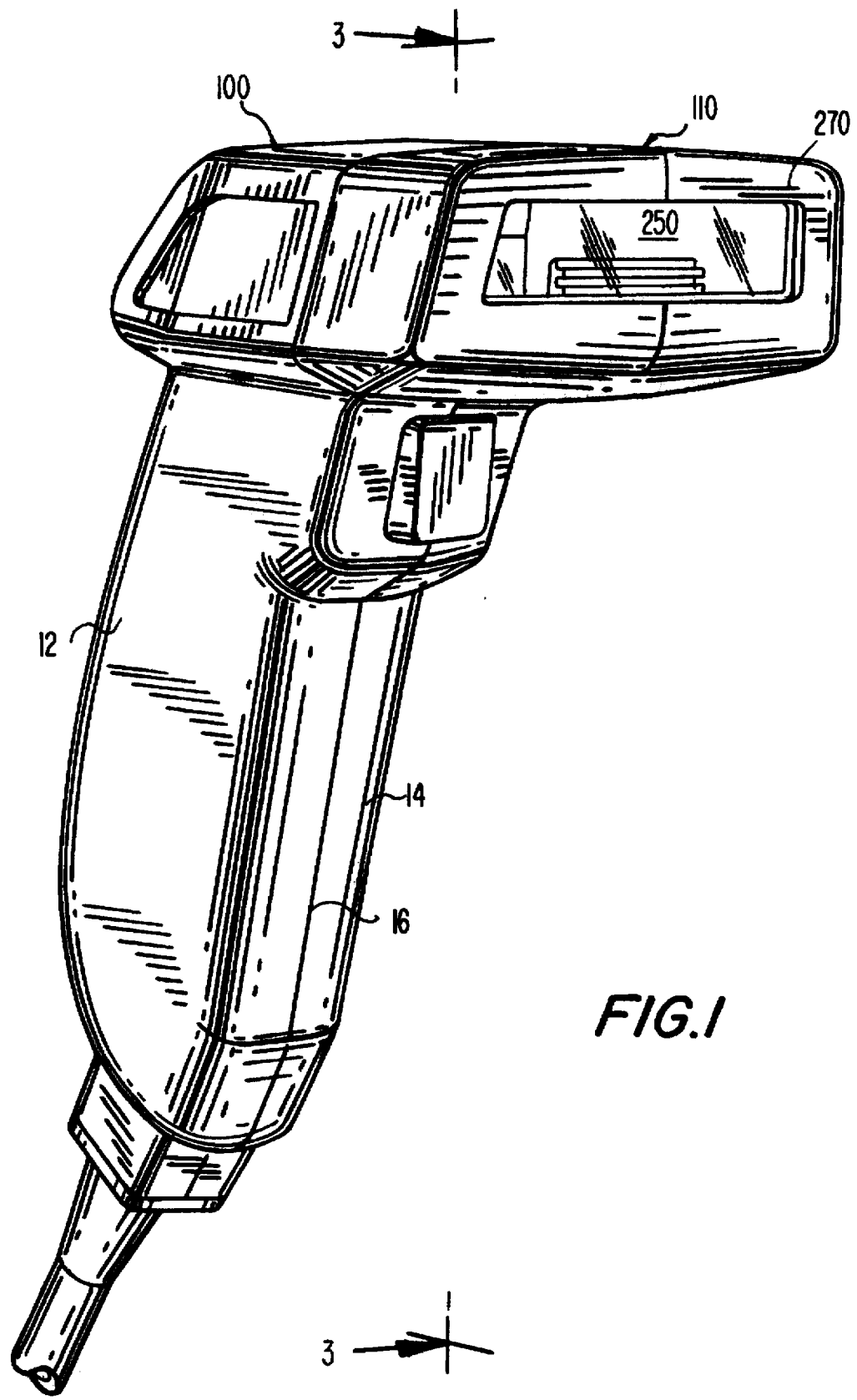
FIG. 1 is a front perspective elevational view of a bar code scanner and reader system in accordance with a presently preferred embodiment of the invention.

Referring first to FIGS. 1–4, there is shown a portable bar code laser scanner 100 and a reader. A housing 101 contains the electronics and optics of the unit. It is a bi-part shell having left 12 and right 14 portions assembled together along a parting plane 16 where the portions interconnect. The housing is similar to that disclosed in U.S. Pat. No. 5,200,597, referenced above, but has in addition on its head a scanner window frame, called a boot 110, of elastomeric material (rubber like) adapted to receive the head of bar code laser scanner. The boot 110 captures a window 250 or other optical element, against the face of the forward end of the housing 101.

FIG. 1 Shows the housing as a bi-part case having two halves 12 and 14 assembled to define a parting line 16.

Figure 2:
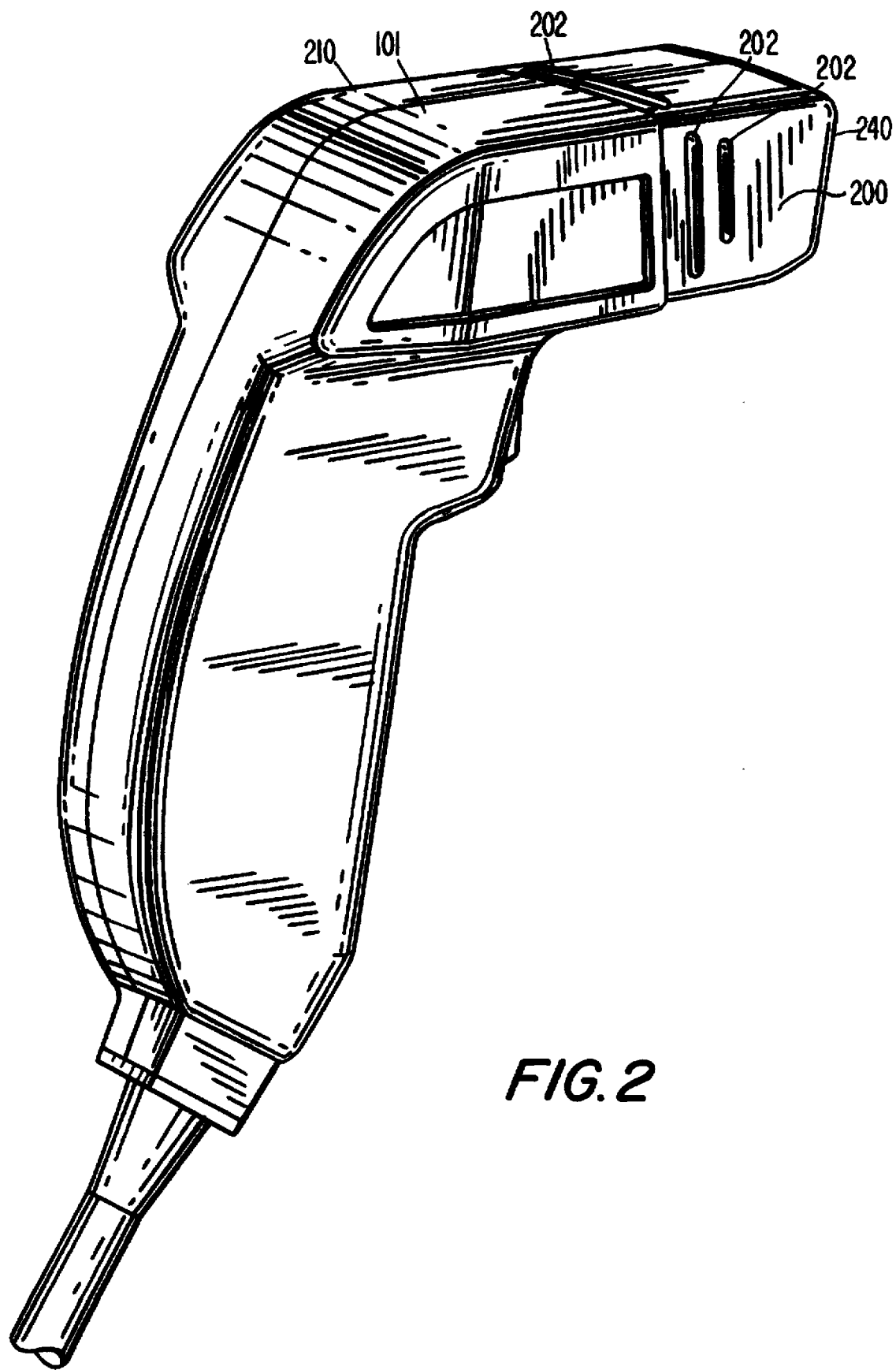
FIG. 2 is a right side perspective view of the bar code scanner of FIG. 1.
Figure 3:
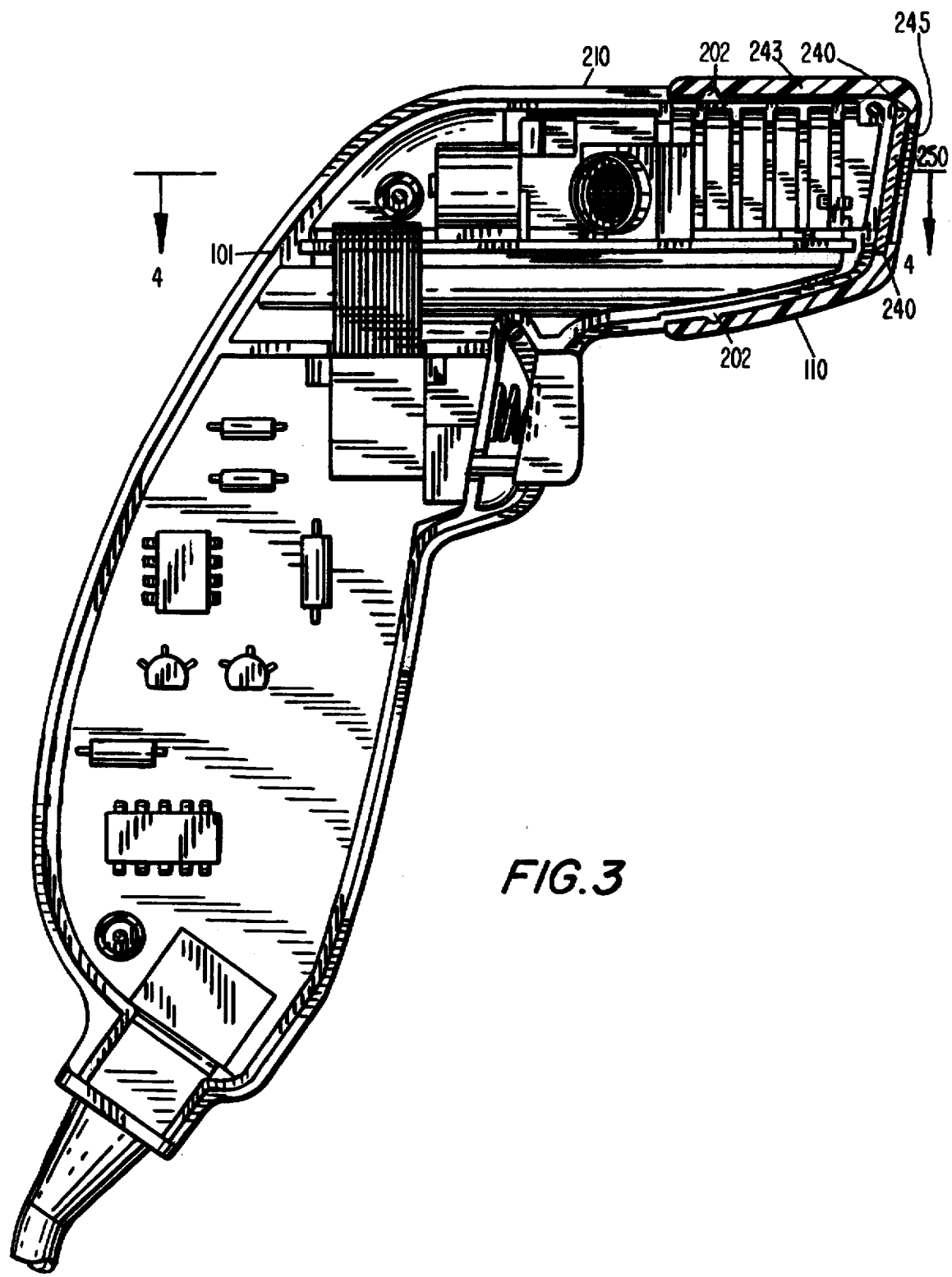
FIG. 3 is a sectional view taken along line 3—3 in FIG. 1.

FIG. 2 shows the scanner with the boot 110 removed, and FIG. 3 is a sectional view of the scanner 100 taken along line 3—3 of FIG. 1. Ribs or tabs 202 are formed on the outer surface of the nose section (nose) 200 of the scanner housing. These ribs 202 cooperate with complementary indentations 230 formed at the inner side of the side skirt 243 of the boot 110 to aid in securing the same to the nose 200. The exterior dimensions of the nose 200, which receives the boot 110, of the head) are slightly smaller than those of the rest of the head, which does not receive the boot 110. The endless or continuous side skirt 243 of the boot 110 can then be essentially flush with the exterior of the housing, back of the nose 200. The dimensions at the face 240 on the front end 241 of the nose 200 of the head are nearly equal those at the back 210 of the head. The face 240 of the nose 200 defines a frame containing a step or ledge 245. The front end of the boot has a face portion 270 with an opening, which forms an edge 249; along its top and bottom and left and right sides 243. See FIG. 5.

Figure 4:
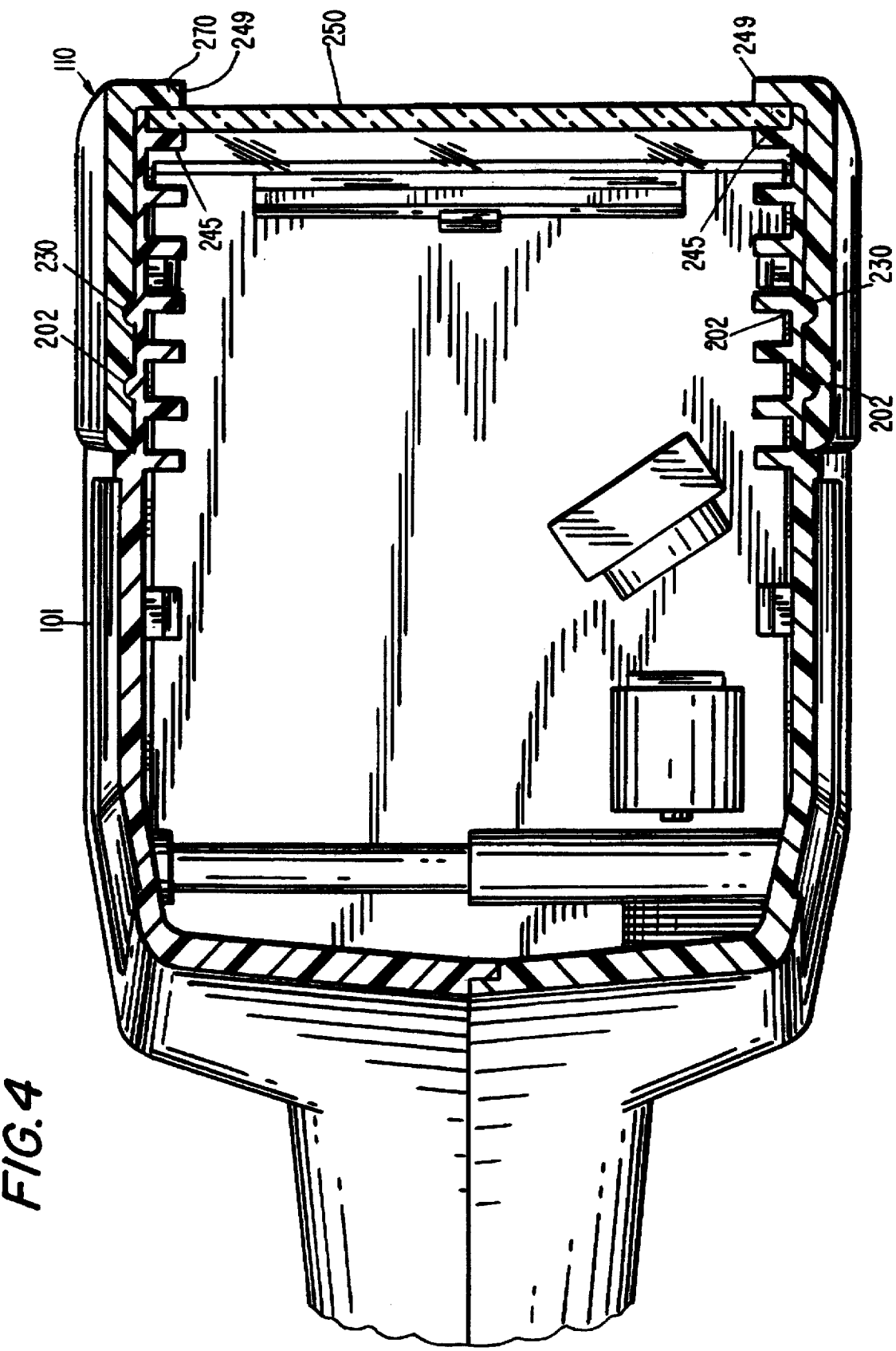
FIG. 4. is a sectional view taken along line 4—4 in FIG. 3.

FIG. 4 is a sectional view of the scanner 100 with the boot 110 mounted thereon and taken along line 4-4 of FIG. 3. The boot 110 has detents 230 which are adapted to receive the tabs 202. The step 245 provides a shoulder at the face 240. This shoulder defines a rectangular opening in which the optical element (e.g. the window 250, though it could be another optical element) is received and held in position. The resilience of the boot assures a snug fit of the element.

Window 250 has four sides; its top and bottom sides, as well as its left and right sides, fit in close relation inside and upon shoulder (also called a step or ledge) 245 at the scanners face 240. In other words, window 250 is held in place by the rubber boot 110. The front end opening is smaller than window 250 so that the top and bottom and right and left sides define a rubber lip (face portion) 270 (shown in perspective view in FIG. 5), will retain window 250 against shoulder 245.

FIG. 4 also shows the interior structure of the head, and in particular shows how the ribs 202, which are integral with housing 101 in its nose 200 FIG. 5 shows a perspective view of the boot 110 detached from the bar code scanner catch the indentations or detents 230.

We claim:

1. A boot adapted for removably securing to a bar code scanner having a housing with a nose section, which has an opening and a plurality of ribs formed on an outer surface thereof, the boot comprising:

a face portion having an opening;

a continuous side skirt made of elastic material extending from a periphery of the face portion, wherein the side skirt is dimensioned to snugly fit over the nose section, the side skirt having indentations complementary to the ribs, which indentations receive the ribs and secure the boot to the nose section; and an optical element dimensioned to seat in the nose-section opening, wherein the face portion opening is smaller than the optical element and the optical element is adapted to be sandwiched between the face portion and a periphery of the nose section opening when the boot is attached to the nose section.

2. A boot according to claim 1, wherein the face portion and the side skirt are unitary, made of same material.

3. A boot according to claim 2, wherein the face portion is substantially rectangular and the side skirt comprises four continuous side walls extending from the periphery of the substantially rectangular face.

4. A boot according to claim 1, wherein the optical element is removable from the face portion.

5. A boot according to claim 4, wherein the optical element is transparent.

6. A boot according to claim 4, wherein the optical element is non-transparent.

7. A boot according to claim 4, wherein the optical element is a Brewster Window.

8. A boot according to claim 4, wherein the optical element is a filter.

* * * * *